Figures 1, 2:
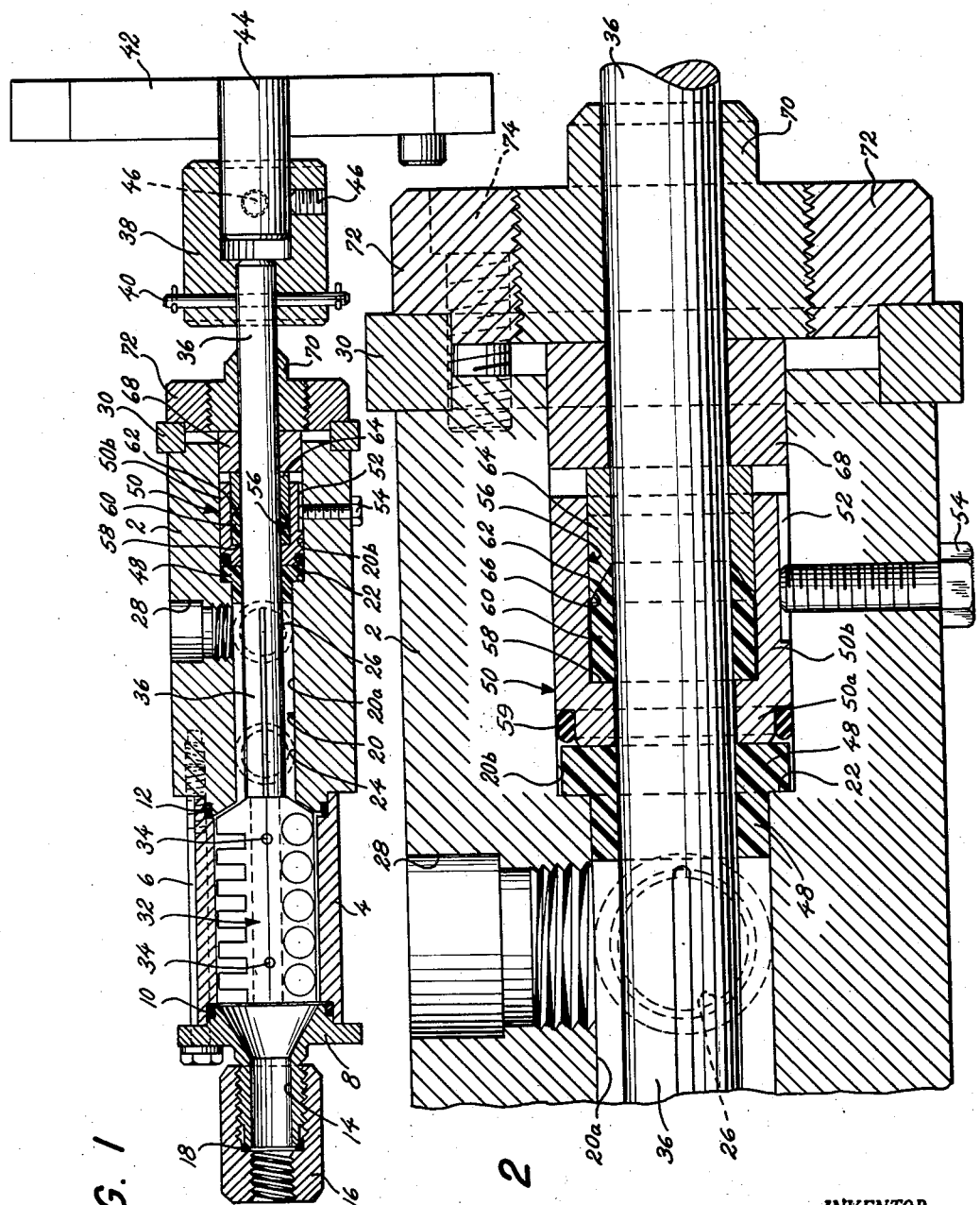

Nov. 13, 1962 J. DUNNOUS 3,063,726
SHAFT MOUNTING ARRANGEMENT
Filed Feb. 18, 1960

INVENTOR.
JACK DUNNOUS
BY James and Franklin
ATTORNEYS

United States Patent Office 3,063,726
Patented Nov. 13, 1962

3,063,726
SHAFT MOUNTING ARRANGEMENT
Jack Dunnous, Philadelphia, Pa., assignor to Novo Industrial Corporation, a corporation of New York
Filed Feb. 18, 1960, Ser. No. 9,608
9 Claims. (Cl. 277—12)

The present invention relates to a structure for rotatably supporting a shaft and preventing leakage therearound.

The basic structural arrangement here involved is particularly applicable to those cases where the sealing means which prevents leakage must withstand appreciable pressures and where the shaft is mounted for rapid rotation. It is here specifically illustrated as embodied in a device for intimately mixing reactive chemical components, such as epoxy resins and catalysts or hardeners therefor. In machines of this type, particularly used in conjunction with automatic proportional metering, mixing and dispensing systems such as those shown in Schneider Patent 2,788,953 of April 16, 1957, the reactive composition within the mixer may be maintained under pressures as high as 3000 p.s.i., and the mixer shaft may be rotated at speeds of 1800 r.p.m. or 3600 r.p.m. Since the mixture of resin and hardener is reactive, and sets to an extremely hard condition, any leakage of the reactive mix into or through the shaft bearing will, when the mix hardens, effectively freeze the shaft within the bearing, and it is an exceedingly difficult matter to remove the set and hardened resin. Accordingly, it is of the utmost importance that the shaft be mounted in such a way as to permit its ready rotation, but at the same time effectively to prevent any leakage into the bearing.

Moreover, because of the high speed and comparatively small size of the rotative elements of the mixer the shaft mounting arrangement should exert as little frictional resistance on the shaft as possible. The greater the frictional resistance, the greater the wear and hence the deterioration of the structure as it is used. The greater the frictional resistance, the larger and more expensive must be the motor which drives the shaft, and the greater must be the current consumption during operation. These factors adversely affecting initial cost and operational cost respectively.

The construction must also be of such a nature that it can readily be disassembled in the event of failure completely to achieve its desired objectives, thereby to facilitate the removal of set resin from the bearing. The length of time involved in repairing a mixer in the event of such a mishap is exceedingly important, since for lack of a mixer an entire dispensing system will be made idle and production lines will be brought to a standstill.

In accordance with the present invention the shaft is surrounded by a member which is fixed relative to the housing, the interface between that member and the housing being sealed by a stationary seal which, because of its lack of movement, is not subject to wear and therefore is exceptionally reliable. A circumferential space is defined between this member and the shaft, and in that circumferential space is located a first packing element which sealingly surrounds and rotates with the shaft. A second packing element is located in the circumferential space above the first packing element and is pressed down against the first packing element in such a way as to cause it to grip the shaft more firmly and thus produce a reliably effective seal along the outer surface of the shaft. This second packing member does not rotate relative to the shaft. The first packing member is formed of a deformable material which closely engages and rotates with a minimum of friction relative to the surfaces of the surrounding member and the second packing element which it engages. In the preferred embodiment here illustrated the surrounding member is formed of aluminum, the second packing element is formed of a bearing metal such as bearing bronze, and the first packing element is formed of graphite-filled "Teflon" (DuPont's trade name for a polytetrafluoroethylene resin). The axial pressure which forces the second packing element against the first packing element may be derived from a conventional gland arrangement which surrounds the shaft. The second packing element makes bearing engagement with the shaft. As the shaft rotates the first packing element laps itself in on the surfaces of the surrounding member and the second packing element, thereby producing smooth sealing surfaces which offer little frictional resistance to relative rotation, and some of the graphite carried by the first packing element embeds itself in the surfaces of the surrounding member and the second packing element, thereby further facilitating relatively free frictional rotation.

The surrounding member in which the packing elements are received may rest upon a deformable plastic bushing, and the axial pressure exerted on the first packing element is transmitted by that element to the surrounding member and presses that member against the bushing, thus compressing the bushing and effecting a further seal.

To the accomplishment of the above, and to such other objects as may hereinafter appear, the present invention relates to a structure for sealingly rotatably mounting a shaft, as defined in the appended claims and as described in this specification, taken together with the accompanying drawings, in which:

FIG. 1 is a cross sectional view of a mixer having a rotatable paddle-like mixing element attached to a shaft which is supported and sealed in accordance with the present invention; and FIG. 2 is an enlarged cross sectional view of the parts of the shaft mounting and sealing assembly.

The mixer in connection with which the instant invention is here illustrated comprises a body 2 to one end of which a tubular wall 4 is secured by means of bolts 6, the interior of that tubular wall 4 defining the mixing chamber proper. The bolts 6 secure a cap 8 to the free end of the tubular wall 4, closing its outer end, and sealing rings 10 and 12 are interposed between the ends of the tubular wall 4 and the cap 8 and body 2 respectively. The cap 8 is provided with an exit passage 14, and a fitting 16 may be threadedly secured thereto, a sealing ring 18 being engaged between the fitting 16 and the projecting portion of the cap 8 in order to prevent any reactive mix from reaching the screw threads.

The body 2 is provided with an axial recess 20 therethrough defined by a first part 20a and a second part 20b, the second part 20b having a larger diameter than the first part 20a, a shoulder 22 being defined between the two parts 20a and 20b. Inlet ports 24, 26 and 28 pass through the body 2 and communicate with the recess part 20a. These ports may be used for feeding into the mixer the components to be mixed and/or purging compounds. A mounting bracket 30 is welded or secured in any other manner to the body 2.

Mixing is effected by a paddle generally designated 32 which fits closely within the mixing chamber proper defined by the tubular wall 4, that paddle being connected by means of pins 34 to a shaft 36 which extends through the body recess 20 with appreciable clearance therearound. That portion of the shaft 36 which extends beyond the body 2 is connected to coupling 38 by means of pin 40, the coupling in turn being connected to a driving gear 42 by means of gear shaft 44 and set screws 46.

Turning now to the bearing sealing arrangement for the shaft 36, a bushing 48 rests on the shoulder 22, has a portion extending into the recess part 20a and has a portion in the recess part 20b. The bushing 48 may be formed of some deformable plastic material such as "Teflon." It closely surrounds the shaft 36, being sufficiently loose thereon so as not to rotate therewith, and preferably is graphite-filled so as to offer minimal frictional to rotation of the shaft 36.

Positioned above and resting on the bushig 48 is the surrounding member generally designated 50, that member comprising a first portion 50a of reduced outer diameter which directly engages the bushing 48, and a second portion 50b having an outer diameter closely the same as the inner diameter of the recess part 20b. A longitudinal groove 52 is formed in the outer surface of the member portion 50b, and a locking screw 54 threadedly mounted in the body 2 has a tip which enters the groove 52 and thus locks the member 50 against rotation relative to the housing 2. The second member portion 50b surrounds and is radially outwardly spaced from the shaft 36, thereby defining between itself and the shaft 36 a circumferential space generally designated 56 which is open at its axially upper end and which has a shoulder 58 at its axially lower end. Sealing ring 59 is compressed between the outer surface of the first member portion 50a and the inner surface of the recess part 20b.

A first packing element 60 is received within the circumferential space 56 and is supported at its lower end by the member shoulder 58. This packing element 60 surrounds and sealingly grips the shaft 36 so as to rotate therewith, and is preferably a slight press fit on the shaft 36. Its outer diameter is slightly less than the inner diameter of the member portion 50b, so that the packing element 60 is rotatable relative to the member 50. It has an upper surface 62 which is inclined axially downwardly (to the left as viewed in FIGS. 1 and 2) and radially outwardly relative to the shaft 36. It is formed of deformable material, and material which will have a low coefficient of friction relative to the parts which it engages (other than the shaft 36). In the specific embodiment here disclosed it is formed of graphite-filled "Teflon."

Also located in the circumferential space 56, and above the first packing element 60, is a second packing element 64 having a lower surface 66 which mates with the inclined upper surface 62 of the first packing element 60. The second packing element 64 is formed of bearing metal such as bearing bronze. and is adapted to remain stationary relative to the housing 2 and to have bearing engagement with the shaft 36. It extends above the upper end of the member 50, and bushing 68 rests thereon, that bushing being interposed between the second packing element 64 and a gland nut 70 which is threadedly received in upper cap 72 secured to the body 2 in any appropriate manner, as by means of screws 74.

When the construction here disclosed is assembled and ready for use the gland nut 70 is screwed down and is preferably made hand-tight. Through the intermediation of bushing 68, the second packing element 64, and the first packing element 60, the member 50 is pressed downwardly onto the bushing 48, pressing that bushing 48 against the shoulder 22. This serves to seal the inner surface of the recess 20 and to provide a secondary sealing effect along the outer surface of the shaft 36 arising from the radial compression of the bushing 48 accompanying its axial compression. Leakage along the inner surface of the recess 20 is further prevented through the action of the sealing ring 59. Since neither the bushing 48 nor the sealing ring 59 rotate relative to the body 2, the sealing effect which they produce relative to the body 2 has a very high degree of reliability.

The axial pressure exerted on the first packing element 60 by the second packing element 64 presses the first packing element 60 against the member shoulder 58 and also, by virtue of the orientation of the surfaces 62 and 66, radially compresses the packing element 60 against the shaft 36, thus producing an effective and reliable seal along the surfaces of the shaft The pressure of the first packing element 60 against the shoulder 58 produces a seal at that interface.

Of all of the parts of the mounting assembly, only the first packing element 60 rotates with the shaft. Its lower surface rides over the member shoulder 58 and its upper surface 62 rides over the lower surface 66 of the second packing element 64. As this relative rotation occurs the first packing member 60 laps itself in along those surfaces, and some of the graphite carried thereby embeds itself in those surfaces. The extreme smoothness thus produced, together with the pressures exerted thereon, ensure adequate sealing and smooth and substantially frictionless relative rotation, this latter effect being heightened by the graphite carried by the packing element 60 and to some extent transferred to the surfaces over which the packing element 60 rotates.

The overall effect of this structure is to produce effective and reliable seals along both the outer surface of the shaft 36 and the inner surface of the body recess 20, capable of resisting exceedingly high pressures within the mixer chamber and the body recess portion 20a, while at the same time greatly minimizing the frictional resistance to rotation exerted on the shaft 36. The only wear which occurs is to be found at the upper and lower surfaces of the first packing element 60, and that wear can readily be compensated for merely by tightening up on the gland nut 70.

If through some mishap the structure should not produce a complete seal, thus necessitating disassembly and cleaning of the unit, the assembly can very readily be disassembled. Removal of the gland nut 70 permits removal of the bushing 68 and second packing element 64 through the top of the body 2. The shaft 36 may be separated from the mixing paddle 32 by disassembling the tubular wall 4 from the body 2 and removing the pins 34, after which the shaft with the first packing element 60 attached thereto may be removed through the top of the body 2. The locking screw 54 is backed off, and then both the member 50 and the bushing 48 may be pushed out through the open top of the body 2.

While but a single embodiment of the present invention has been here disclosed, it will be apparent that many variations may be made therein, all within the scope of the instant invention, as defined in the following claims.

I claim:

1. In combination with a housing having a recess and a shaft received and rotatable in said recess; a member axially supported in said recess, relatively loosely surrounding said shaft so as not to rotate therewith, and having a portion radially spaced from said shaft, said member defining between itself and said shaft a circumferential space which is open at one end and has a shoulder at the other end, means operative between and fixed relative to said member and said housing for sealing the interface between said member and said recess, a first packing element relatively loosely received in said circumferential space, operatively axially supported on said shoulder, and relatively closely surrounding and sealingly engaging said shaft so as to rotate therewith and relative to said member, a second packing element in said circumferential space operatively engaged with said first packing element, said second packing element being relatively loosely received on said shaft so as not to rotate therewith, and means with respect to which said shaft is rotatable operatively engageable with said second packing element for pressing it axially in the general direction of said shoulder and against said first packing element, said first packing element being of material having a low coefficient of sliding friction relative to said member and said second packing element, a stationary seal thereby being provided between said member and said housing and between said shaft and said first packing element, the seal between relatively moving surfaces being defined between said first packing element and the shoulder of said member and the inner surface of the member portion radially spaced from said shaft, on the one hand, and said first packing element on the other hand, thereby defining a sealing area of tortuous configuration.

2. The combination of claim 1, in which said member is made of metal, said first packing element is made of graphite-filled deformable plastic material, and said second packing element is made of bearing metal.

3. The combination of claim 1, in which a bearing bushing having bearing engagement with said shaft is interposed between said second packing element and said axial pressing means.

4. The combination of claim 1, in which said recess has a shoulder located opposite said axial pressing means, a bushing of deformable plastic material resting on said shoulder and relatively loosely surrounding said shaft so as not to rotate therewith, said axial pressing means pressing said member against said bushing, said bushing thereby axially supporting said member and being axially compressed by said member.

5. In combination, a housing having an elongated recess, a shaft rotatably received within said recess with peripheral clearance therearound along at least a substantial portion of its length, a bushing of deformable plastic material supported in said clearance portion of said recess against downward axial movement and having bearing engagement with said shaft, a member in said clearance portion of said recess above and operatively resting on said bushing, said member surrounding said shaft, being non-rotatable therewith and having a portion radially spaced from said shaft so as to define between itself and said shaft a circumferential space open at its upper end and having a shoulder at its lower end, means on said housing engaging said member so as to prevent rotation thereof, said member being adjustably axially movable along said recess, a sealing element sealing the interface between the outer surface of said member and the inner surface of said recess, a first packing element of deformable plastic material rotatably received in said circumferential space, resting on said shoulder, and sealingly engaging and rotating with said shaft, the upper surface of said first packing element being inclined axially downwardly and radially outwardly, a second packing element of bearing material in said circumferential space, operatively axially supported on said first packing element, having bearing engagement with said shaft, and having a lower surface which engages and mates with the upper surface of said first packing element, and means operatively active on said second packing element for pressing it axially downwardly, thereby pressing said first packing element against said shaft and against said shoulder on said member and compressing said bushing between said member and said housing.

6. In combinantion, a housing having an elongated recess, a shaft rotatably received within said recess with peripheral clearance therearound along at least a substantial portion of its length, a bushing of graphite-filled deformable plastic material supported in said clearance portion of said recess against downward axial movement and having bearing engagement with said shaft, a member in said clearance portion of said recess above and operatively resting on said bushing, said member surrounding said shaft, being non-rotatable therewith, and having a portion radially spaced from said shaft so as to define between itself and said shaft a circumferential space open at its upper end and having a shoulder at its lower end, means on said housing engaging said member so as to prevent rotation thereof, said member being adjustably axially movable along said recess, a sealing element sealing the interface between the outer surface of said member and the inner surface of said recess, a first packing element of graphite-filled deformable plastic material rotatably received in said circumferential space, resting on said shoulder, and sealingly engaging and rotating with said shaft, the upper surface of said first packing element being inclined axially downwardly and radially outwardly, a second packing element of bearing metal in said circumferential space operatively axially supported on said first packing element, having bearing engagement with said shaft, and having a lower surface which engages and mates with the upper surface of said first packing element, and means operatively active on said second packing element for pressing it axially downwardly, thereby pressing said first packing element against said shaft and against said shoulder on said member and compressing said bushing between said member and said housing.

7. In combination, a housing having an elongated recess, a shaft rotatably received within said recess with peripheral clearance therearound along at least a substantial portion of its length, a first bushing supported in said clearance portion of said recess against downward axial movement and having bearing engagement with said shaft, a member in said clearance portion of said recess above and operatively resting on said first bushing, said member surrounding said shaft being non-rotatable therewith, and having a portion radially spaced from said shaft so as to define between itself and said shaft a circumferential space open at its upper end and having a shoulder at its lower end, means on said housing engaging said member so as to prevent rotation thereof, said member being adjustably axially movable along said recess, a sealing element sealing the interface between the outer surface of said member and the inner surface of said recess, a first packing element rotatably received in said circumferential space, resting on said shoulder, and sealingly engaging and rotating with said shaft, the upper surface of said first packing element being inclined axially downwardly and radially outwardly, a second packing element in said circumferential space, operatively axially supported on said first packing element, having bearing engagement with said shaft, and having a lower surface which engages and mates with the upper surface of said first packing element, a second bushing in said clearance portion of said recess above said member and said second packing element, said second bushing having bearing engagement with said shaft and operatively resting on said second packing element, and means operatively active on said second packing element via said second bushing for pressing it axially downwardly, thereby pressing said first packing element against said shaft and against said shoulder on said member and compressing said first bushing between said member and said housing.

8. In combination, a housing having an elongated recess, a shaft rotatably received within said recess with peripheral clearance therearound along at least a substantial portion of its length, a first bushing of deformable plastic material supported in said clearance portion of said recess against downward axial movement and having bearing engagement with said shaft, a member in said clearance portion of said recess above and operatively resting on said first bushing, said member surrounding said shaft, being non-rotatable therewith, and having a portion radially spaced from said shaft so as to define between itself and said shaft a circumferential space open at its upper end and having a shoulder at its lower end, means on said housing engaging said member so as to prevent rotation thereof, said member being adjustably axially movable along said recess, a sealing element sealing the interface between the outer surface of said member and the inner surface of said recess, a first packing element of deformable plastic material rotatably received in said circumferential space, resting on said shoulder, and sealingly engaging and rotating with said shaft, the upper surface of said first packing element being inclined axially downwardly and radially outwardly, a second packing element of bearing material in said circumferential space, operatively axially supported on said first packing element, having bearing engagement with said shaft, and having a lower surface which engages and mates with the upper surface of said first packing element, a second bushing in said clearance portion of said recess above said member and said second packing element, said second bushing having bearing engagement with said shaft, and operatively resting on said second packing element, and means operatively active on said second packing element via said second bushing for pressing axially downwardly, thereby pressing said first packing element against said shaft and against said shoulder on said member and compressing said first bushing between said member and said housing.

9. In combination, a housing having an elongated recess, a shaft rotatably received within said recess with peripheral clearance therearound along at least a substantial portion of its length, a first bushing of graphite-filled deformable plastic material supported in said clearance portion of said recess against downward axial movement and having bearing engagement with said shaft, a member in said clearance portion of said recess above and operatively resting on said first bushing, said member surrounding said shaft, being non-rotatable therewith, and having a portion radially spaced from said shaft so as to define between itself and said shaft a circumferential space open at its upper end and having a shoulder at its lower end, means on said housing engaging said member so as to prevent rotation thereof, said member being adjustably axially movable along said recess, a sealing element sealing the interface between the outer surface of said member and the inner surface of said recess, a first packing element of graphite-filled deformable plastic material rotatably received in said circumferential space, resting on said shoulder, and sealingly engaging and rotating with said shaft, the upper surface of said first packing element being inclined axially downwardly and radially outwardly, a second packing element of bearing material in said circumferential space, operatively axially supported on said first packing element, having bearing engagement with said shaft, and having a lower surface which engages and mates with the upper surface of said first packing element, a second bushing in said clearance portion of said recess above said member and said second packing element, said second bushing having bearing engagement with said shaft and operatively resting on said second packing element, and means operatively active on said second packing element via said second bushing for pressing it axially downwardly, thereby pressing said first packing element against said shaft and against said shoulder on said member and compressing said first bushing between said member and said housing.

References Cited in the file of this patent

UNITED STATES PATENTS

| | | |
|---|---|---|
| 1,486,312 | Ullman | Mar. 11, 1924 |
| 1,788,966 | Wilson | Jan. 13, 1931 |
| 2,048,320 | Bennett | July 21, 1936 |
| 2,744,774 | Wist | May 8, 1956 |